(12) United States Patent
Agoston et al.

(10) Patent No.: US 9,363,045 B2
(45) Date of Patent: Jun. 7, 2016

(54) BOUNDED UNCORRELATED SIGNAL IMPAIRMENT DECONVOLUTION FOR TOTAL SIGNAL IMPAIRMENT EXTRAPOLATION

(71) Applicant: TEKTRONIX, INC., Beaverton, OR (US)

(72) Inventors: Maria Agoston, Beaverton, OR (US); Pavel R. Zivny, Portland, OR (US)

(73) Assignee: TEKTRONIX, INC., Beaverton, OR (US)

( * ) Notice: Subject to any disclaimer, the term of this patent is extended or adjusted under 35 U.S.C. 154(b) by 754 days.

(21) Appl. No.: 13/706,289

(22) Filed: Dec. 5, 2012

(65) Prior Publication Data

US 2013/0142242 A1    Jun. 6, 2013

Related U.S. Application Data

(60) Provisional application No. 61/567,063, filed on Dec. 5, 2011.

(51) Int. Cl.
*G01R 29/26* (2006.01)
*H04L 1/20* (2006.01)

(52) U.S. Cl.
CPC .................................... *H04L 1/205* (2013.01)

(58) Field of Classification Search
CPC ..... H04L 25/4927; H04L 1/203; H04L 1/205; H04M 3/2236; G10L 25/90; G06T 2207/30168
See application file for complete search history.

(56) References Cited

U.S. PATENT DOCUMENTS 7,522,661 B2    4/2009    Nelson et al.
8,578,221 B1 *  11/2013   Ikoma ..................... H04L 1/203
                                                    714/707

(Continued)

OTHER PUBLICATIONS

Kuo, A. et al, "Crosstalk Bounded Uncorrelated Jitter (BUJ) for High-Speed Interconnects," IEEE/Transactions on Instrumentation and Measurements, Oct. 30, 2005, pp. 1800-1810, vol. 54, issue 5.

(Continued)

*Primary Examiner* — Elias Desta
(74) *Attorney, Agent, or Firm* — David A. Crowther; Thomas F. Lenihan; Marger Johnson

(57) ABSTRACT

Methods and systems are described for analyzing signal impairments using a test and measurement instrument. A method may include decomposing aggregate signal impairments into signal impairments that are correlated and uncorrelated to an acquired data pattern. The uncorrelated signal impairments may be further decomposed into periodic signal impairments (e.g., PJ) and non-periodic uncorrelated signal impairments. A PDF of the non-periodic uncorrelated signal impairments may be mathematically integrated, thereby producing an estimated cumulative distribution function (CDF) curve. Random signal impairments may be estimated as an unbound Gaussian distribution. The CDF curve of the non-periodic uncorrelated signal impairments and the unbound Gaussian distribution may be plotted in Q-space on a display device. Non-periodic bounded uncorrelated signal impairments (e.g., NP-BUJ) PDF may then be isolated. Bounded uncorrelated signal impairments PDF may then be synthesized. Complete uncorrelated signal impairments PDF may be synthesized. A synthesis of the decomposed components can be performed at a user-defined bit error rate to generate the total estimated jitter (e.g., TJ@BER or TN@BER).

28 Claims, 6 Drawing Sheets

(56) References Cited

U.S. PATENT DOCUMENTS 8,594,169 B2    11/2013    Zivny et al.
2011/0103451 A1*    5/2011    Agoston ................ H04L 1/205
                                                                        375/226

OTHER PUBLICATIONS

Shimanouchi, M., et al., "New Modeling Methods for Bounded Gaussian Jitter (BGJ)/ Noise (BGN) and Their Applications in Jitter/ Noise Estimation/Testing," IEEE/International Test Conference, 2009, Paper 13.3, pp. 1-8., Austin, Texas.

Li, M., et al, "A New Crosstalk Jitter Separation Method", DesignCon 2010, Santa Clara, California, Feb. 1-4, 2010, pp. 1-14, Table of Contents vol. 1, vol. 2, EE Times Group, 2010, San Francisco, California.

Miller, M, et al., "Quantifying Crosstalk Induced Jitter in Multi-lane Serial Data Systems", DesignCon 2009, Santa Clara, California, Feb. 2-5, 2009, pp. 1-21, Table of Contents vol. 1-3, International Engineering Consortium, 2009, Chicago, Illinois.

Zivny, P. et al., "Method of Ber Analysis of High Speed Serial Data Transmission in Presence of Jitter and Noise," DesignCon 2007, Jan. 29-Feb. 1, 2007, Santa Clara, California, pp. 1-18, Table of Contents vol. 3., Curran Associates, Inc., Red Hook, NY.

Vandersteen, G., et al., "Maximum Likelihood Estimator for Jitter Noise Models," IEEE Transactions on Instrumentation and Measurements, vol. 49, No. 6, Dec. 2000.

Stephens, R., "Characterizing, anticipating, and avoiding problems with crosstalk," DesignCon 2006, International Engineering Consortium, Feb. 6-9, 2006, Santa Clara, California, pp. 1-18, Table of Contents vol. 1-3., Curran Associates, Inc., Red Hook, NY.

* cited by examiner

BOUNDED UNCORRELATED SIGNAL IMPAIRMENT DECONVOLUTION FOR TOTAL SIGNAL IMPAIRMENT EXTRAPOLATION

CROSS REFERENCE TO RELATED APPLICATION

This application claims the benefit of provisional patent application Ser. No. 61/567,063, filed Dec. 5, 2011, herein incorporated by reference.

BACKGROUND

Embodiments of the present invention relate to jitter and noise, and more particularly, to instruments, systems and methods for deconvolving, synthesizing and analyzing jitter and noise.

Jitter and noise are signal impairments that cause signal quality problems in high-frequency signals. Jitter and noise may be caused by various types of sources, such as electromagnetic interference, crosstalk, data-dependent effects, random sources, and so forth. In general, jitter may be identified as the "horizontal" displacement of various aspects of pulses in a high-frequency signal or waveform, and noise can be thought of as the "vertical" displacement. Jitter may be identified on the horizontal axis of an oscilloscope (typically measured in units of time), while noise may be identified on the vertical axis of an oscilloscope (typically measured in units of voltage).

More specifically, the term jitter refers to the horizontal displacement from an ideal position of various aspects of pulses of a signal or waveform, such as the displacement of various aspects of pulses of a signal or waveform within the time domain, phase timing, or the width of the pulses themselves. The term noise refers to the vertical displacement of various aspects of pulses of a signal or waveform, such as amplitude error in the signal or other vertical noise effects.

Crosstalk between adjacent channels of high-speed interconnects significantly affects the performance of serial links. The presence of crosstalk impairs the accuracy of the current jitter and noise measurement methodologies, resulting in reductions to the design margins for the high-speed link devices at a high cost to manufacturers.

The analytical models used by the test and measurement industry have been evolving to allow for more accurate estimation of jitter and noise behavior at higher bit error rates (BER). Complementing the jitter analysis with noise analysis proved to be a more accurate predictor of the BER than jitter alone, such an approach lending itself to root-cause problem identification.

Jitter and noise can be "decomposed" (e.g., separated) into various components in order to aid in the analysis of the total impairment of communication link or an associated system (e.g., transmitter, receiver, transmitter and receiver pair, electronic device or component, etc.) using a test and measurement instrument such as an oscilloscope. Conventional approaches for decomposing jitter include separating deterministic jitter (DJ) from random jitter (RJ), and then "reassembling" (e.g., synthesizing or convolving) the jitter components for analysis of the total jitter at a specific bit error rate (BER), sometimes referred to as TJ@BER.

Particularly in the presence of crosstalk, uncorrelated jitter or noise comprises both bounded and unbounded components. In one decomposition approach, as disclosed in commonly-owned U.S. Pat. No. 7,522,661, jitter or noise is decomposed into correlated and uncorrelated components. The uncorrelated component can be further decomposed—e.g. by spectral separation—into periodic BUJ (P-BUJ or PJ) and, as disclosed in commonly-owned U.S. application Ser. No. 13/081,369, bounded non-periodic jitter.

Crosstalk is mostly a source of bounded noise, and pertinent to this work it is largely uncorrelated to the data stream in the link under test. In the performance assessment of serial devices, the effects of crosstalk on jitter need to be better characterized. One difficulty for the current spectral analysis based tools arises when the crosstalk spectrum becomes broadband, such as for aggressors with long patterns, non-repetitive serial traffic, synchronous or asynchronous to the victim under test. The resulting spectral flooding leads to the lifting of the noise and jitter floors, thereby rendering the crosstalk components indistinguishable from the residual random elements. What is needed is an enhanced ability to quantify the effects of crosstalk in the victim channel (i.e., the channel being affected by the crosstalk).

In addition, the division between periodic jitter and non-periodic jitter can be imperfect because of a variety of observation-time-related or computational factors, which can lead to partial correlation between the periodic and non-periodic categorizations, which in turn can lead to inaccuracies when the jitter is subsequently mathematically convolved because of the presence of partially correlated distributions, which itself in turn can result in inaccurate (i.e., overly pessimistic) estimates of TJ@BER. Conventional methods are not capable of supplying enough information about the jitter to discern this possible partial correlation, or the degree to which the components might be correlated.

While the decomposition of jitter and noise are important for understanding the root cause of signal impairment, there is a need for those designing and measuring fast communication links to be able to accurately predict the BER level, and the immediately underlying BER limiting factors such as the total jitter (TJ@BER), the total noise (TN@BER), and the whole BER eye and/or contours. There remains a need for providing improved methods and systems for accurately accomplishing such calculations using an oscilloscope by algorithmic synthesis from components found in the decomposition of the jitter or noise.

Figure 1A:
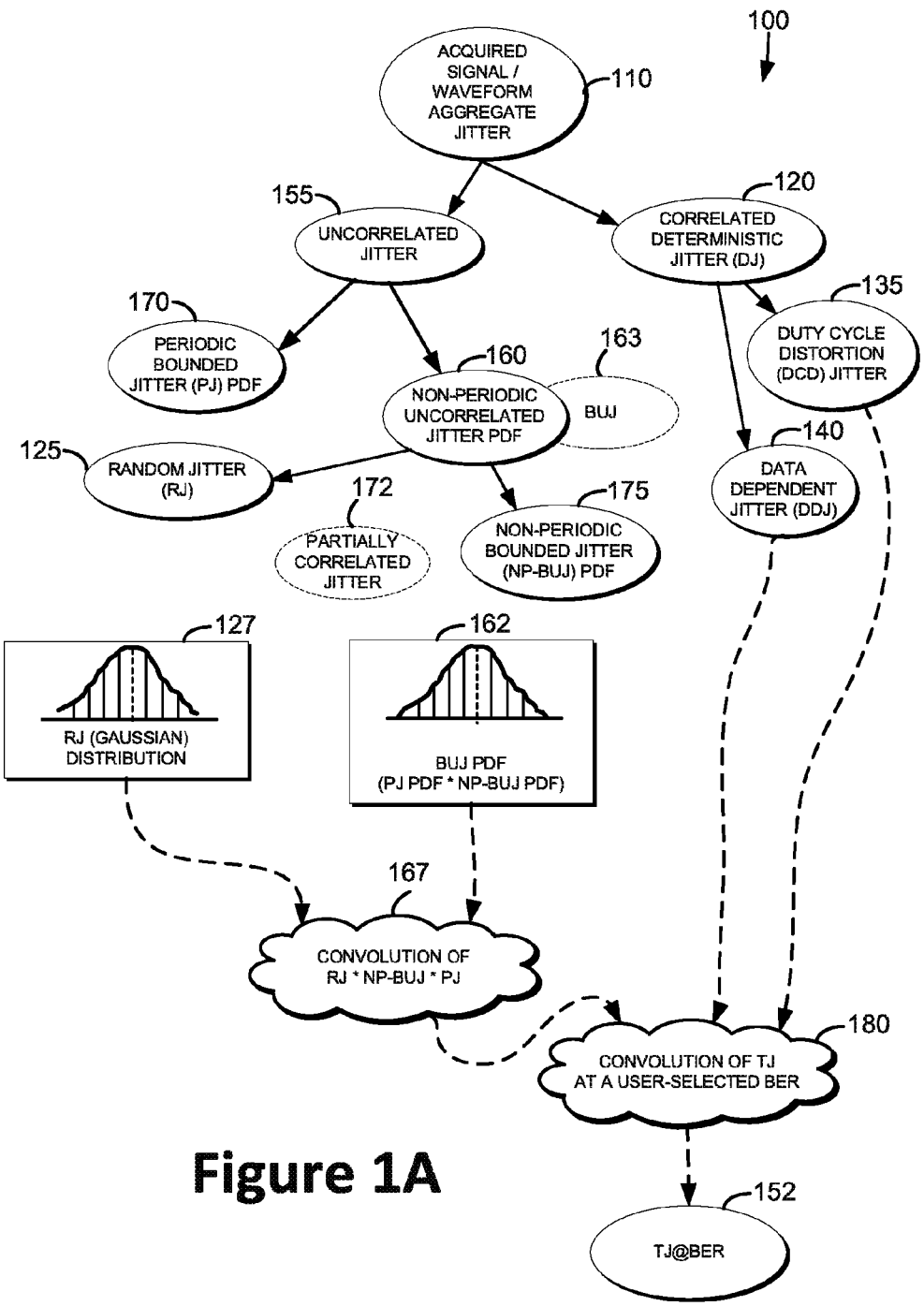
FIG. 1A illustrates a diagram showing the decomposition of signal impairment components of a waveform and the synthesizing thereof into a total impairment value at a given bit error rate, in accordance with embodiments of the present invention.

The foregoing and other features and advantages of the inventive concepts will become more readily apparent from the following detailed description of the example embodiments, which proceeds with reference to the accompanying drawings.

DETAILED DESCRIPTION

Reference will now be made in detail to embodiments of the present invention, examples of which are illustrated in the accompanying drawings. In the following detailed description, numerous specific details are set forth to enable a thorough understanding of the inventive concepts. It should be understood, however, that persons having ordinary skill in the art may practice the inventive concepts without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first port could be termed a second port, and, similarly, a second port could be termed a first port, without departing from the scope of the inventive concept.

The terminology used in the description of the various embodiments herein is for the purpose of describing particular embodiments only and is not intended to be limiting of the inventive concepts. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

It will be understood that the terms "reassemble," "synthesize," and "convolve" are used interchangeably herein when referring to reassembling previously deconvolved signal impairment components. It will also be understood that the terms "decompose" and "deconvolve" are also used interchangeably herein when referring to breaking down or otherwise separating different signal impairment components into different and more specific categories. Similar methods of deconvolving and synthesizing can be applied to noise as well.

Reference is made herein to a test and measurement instrument. The test and measurement instrument can implement or include various example embodiments of the present invention, which can be applied in a variety of ways and to a variety of different applications, including for example, the measurement and analysis of jitter or noise associated with digital or analog signals. The signals can be associated with, for example, high-frequency wired or wireless communication systems, high-speed memory or other logic circuits, storage devices, networks, and so forth. The test and measurement instrument as described herein can be used for precision decomposing, convolving, and/or analyzing the jitter and/or noise of a signal.

Briefly, as also explained above, the term "jitter" as used herein refers to the "horizontal" displacement of various aspects of pulses of a signal or waveform, such as for example the displacement of the pulses within the time domain, phase timing, or the width of the pulses themselves. The term "noise" as used herein refers to the "vertical" displacement of various aspects of pulses of a signal or waveform, such as for example amplitude error in the signal or other vertical noise effects.

As a reminder to the reader, though the discussion that follows may be described in terms of the decomposition and analysis of jitter impairments, the same or substantially the same methods and related systems may be applied to noise impairments. The term "signal impairments" as used herein refers to either jitter impairments or noise impairments, or both jitter impairments and noise impairments.

More particularly, while the inventive techniques disclosed herein are generally discussed in the context of jitter rather than noise, the embodiments of the invention disclosed herein can be used to decompose, isolate, convolve, synthesize, and/or analyze either jitter or noise, or both, associated with a signal or waveform. In sum, the following discussion of jitter should be considered as merely exemplary of a specific type of signal impairment.

Figure 1B:
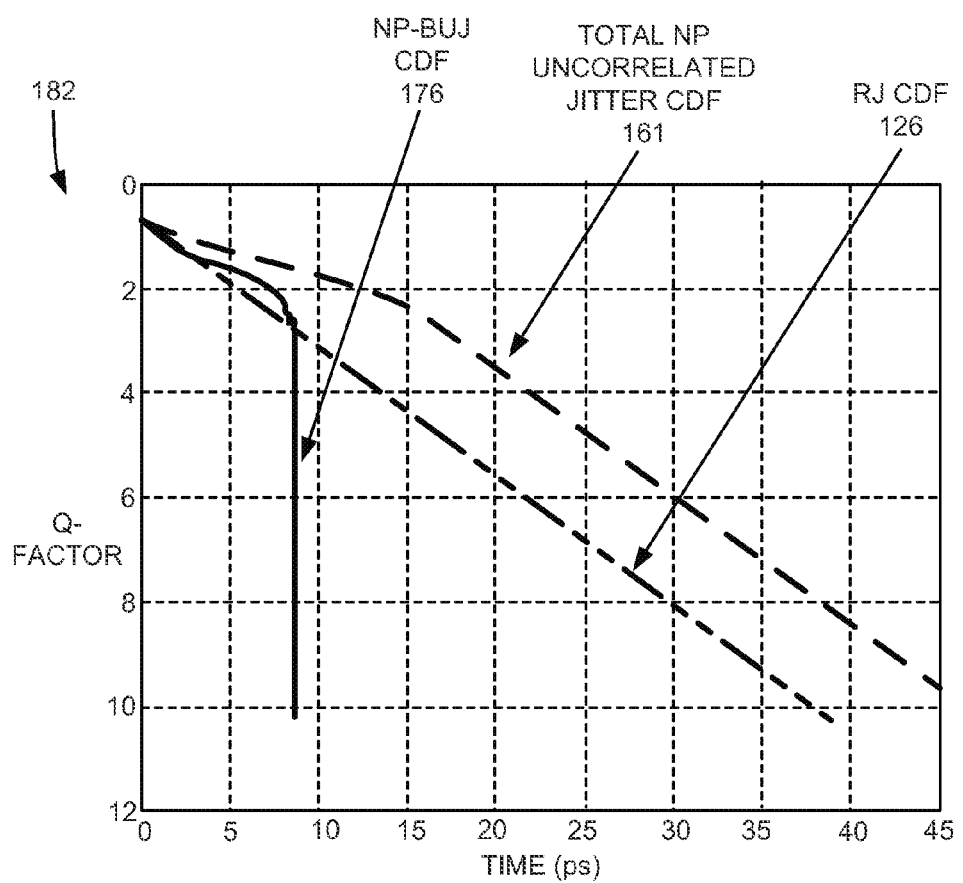
FIG. 1B illustrates a plot in accordance with embodiments of the present invention.

FIG. 1A illustrates a diagram 100 showing the decomposition of signal impairment components of a waveform and the synthesizing thereof into a total impairment value at a given bit error rate (BER), in accordance with embodiments of the present invention. FIG. 1B illustrates a plot 182 in accordance with embodiments of the present invention. Reference is now made to FIGS. 1A and 1B.

An acquired signal or waveform includes "composite" or aggregate jitter 110. The aggregate jitter 110 can be decomposed or deconvolved into its constituent parts for further analysis. For example, after determining the composite jitter 110, a separation technique can be used to separate deterministic jitter (DJ) 120 from uncorrelated jitter 155. In general, the composite jitter 110 is decomposed into correlated deterministic jitter 120 and uncorrelated jitter 155 using a spectral jitter separation technique optionally combined with a data pattern correlation technique, as described in commonly-owned U.S. application Ser. No. 13/081,369, incorporated herein by reference.

The deterministic jitter 120 can be further divided into data dependent jitter (DDJ) 140 and/or duty cycle distortion (DCD) jitter 135. Techniques for separating the DJ 120 into its constituent components DDJ 140 and/or DCD 135 (among other possible deterministic jitter components such as sub-harmonic jitter) are known in the art and not of central importance to the various embodiments of the present invention.

The uncorrelated jitter 155 can be further decomposed—e.g. by spectral separation in the frequency domain—into periodic bounded jitter BUJ (P-BUJ or PJ) 170 and non-periodic uncorrelated jitter 160. After the removal of the PJ 170, the remaining spectrum can be returned to the time domain, yielding the non-periodic uncorrelated jitter components or distribution 160. The PJ 170 can be stored as a PDF in a storage medium such as a memory for later use in a synthesis technique with other jitter components, as further described below. In addition, the PDF 160 of the non-periodic uncorrelated jitter components can be stored in the storage medium for later use as further described below. The inventors developed a methodology where a further deconvolution of the non-periodic uncorrelated jitter components can be performed as follows:

The non-periodic uncorrelated jitter distribution contains the effects of random jitter and noise, as well as the bounded artifacts of crosstalk in the form of bounded, uncorrelated, non-periodic jitter and noise components. The non-periodic uncorrelated jitter distribution or PDF 160 (FIG. 1A) can be integrated to produce a cumulative density function (CDF) curve 161 (FIG. 1B). In other words, the PDF 160 of the non-periodic uncorrelated jitter can be converted to a CDF 161 by numerical integration. The extraction of the remaining uncorrelated elements of jitter is performed by analyzing the CDF curve 161 of the total non-periodic uncorrelated jitter 160 in Q-space, as shown in FIG. 1B.

Random jitter (RJ) 125 can assumed to be unbound Gaussian RJ. A model of the RJ can be developed by fitting to the CDF, for example, in a process known as Dual Dirac, otherwise known as RJdd. This fitting is preferably done in the so-called Q-space in which the CDF 126 of Gaussian PDF appears as a straight line in FIG. 1B. This methodology is described in commonly-owned U.S. Pat. No. 7,522,661, which is incorporated herein by reference. The RJ and RJdd numerical values approach each other in a limit and are so close in practical situations they can substitute one for another. (The other part of this well-known Dual Dirac model, the DJdd, can not be generally assumed to approximate a physical DJ or similar useful physical value; our methodology doesn't therefore use DJdd in this step.) Note that the distribution of RJ and RJdd is known, or rather assumed, Gaussian and so can readily be plotted. This is useful immediately as follows:

In accordance with embodiments of the present invention, the RJdd (the model of RJ) is plotted as RJ CDF 126 in a CDF plot as shown in FIG. 1B. In addition, the total non-periodic uncorrelated jitter is plotted as CDF 161. The deconvolved non-periodic bounded uncorrelated jitter (NP-BUJ) can be found for any Q-value by finding the value of the total non-periodic jitter 161 at the particular Q-value, and subtracting the RJdd at the same Q-value. For example, at Q value of 6, the total non-periodic uncorrelated jitter 161 is 30 picoseconds (ps); the RJdd (e.g., RJ 126) at Q of 6 is 22 ps; and therefore, the NP-BUJ 176 is 30 minus 22 (i.e. 8) ps. The resulting NP-BUJ CDF can be plotted as CDF 176. While the results here are expressed as a CDF, a conversion method back to PDF can be performed (e.g., by mathematical derivation).

Once the RJ 125 is de-embedded or otherwise stripped off from the non-periodic uncorrelated jitter 160 using the technique described above, then a probability distribution or PDF of the NP-BUJ 175 (FIG. 1A) can be produced by mathematical derivation of the NP-BUJ CDF 176 (FIG. 1B). The resulting NP-BUJ PDF 175 can be stored in a storage medium such as a memory for later synthesis with other jitter components, as further described below. An analogous separation method can be applied to noise analysis, which yields a non-periodic bounded uncorrelated noise (NP-BUN) PDF, which can be used to quantify the effects of crosstalk on noise.

The NP-BUJ 175 may have unclear, spread, or wide spectral distribution, and might also be referred to as wide spectrum jitter or smeared spectrum jitter. Such bounded uncorrelated jitter 175 can be a result of, for example, cross-talk or other signal interference and/or anomalies.

The separation and reconciliation of effects of jitter and noise can be performed before a full synthesis of a BER eye is generated. The effects of random noise are de-embedded, thus quantifying horizontal (random jitter) and vertical (random noise) components. The periodic spectra of jitter and noise can be reconciled in the frequency domain, component by component (e.g., frequency by frequency). If a discrete frequency line is observed in the jitter spectra, but not in the amplitude spectra, it is categorized as "true" periodic jitter (PJ). Otherwise, if a component is observed in both spectra, it is categorized as "true" periodic noise (PN). The amplitude of each frequency component can be determined by the average amplitude from every acquisition, but the phases can be taken from a single acquisition to preserve the phase relationship across the entire spectrum. Since the phases are accurately preserved, the PJ and PN spectra can be brought back into the time domain through an inverse fast fourier transform (IFFT), and thereby produce the PDF of the periodic components directly, without relying on approximations or simplifications.

In this manner, the effects of noise and jitter can be separated and a detailed analysis of their components can be performed. This allows for a high quality evaluation of the key statistical product, i.e., the BER eye diagram, which can also include 360 degree BER eyes. This approach is more accurate than those that could be obtained by simple extrapolation of, for example, BER growth in the absence of characterization of the underlying components. BER eyes are the basis for computing the total jitter (TJ) and total noise (TN), at a user specified bit error rate. Horizontal and vertical eye openings can be estimated for a specified BER, at a specified horizontal threshold and vertical sample slices.

The synthesis process includes convolving the bounded elements. First, a BUJ PDF 162 can be generated by convolving the PJ PDF 170 with the NP-BUJ PDF 175. Next, the distribution of uncorrelated bounded PDFs (i.e., 162) can be convolved with the assumed Gaussian distribution 127 of the random noise and jitter, as shown as synthesized uncorrelated PDF 167 of FIG. 1A, which is essentially a convolution of RJ*NP-BUJ*PJ. It will be understood that the operator '*' as used herein is not a multiplier operator, but rather it is a combinational indicator that the pertinent signal impairments are convolved, synthesized, or otherwise combined or co-existent. A similar synthesis can be performed for noise components. The random, periodic, and non-periodic components can be combined in noise and jitter uncertainty distributions. Assuming that after the separation and reconciliation process the jitter and noise uncertainties are statistically independent, the combined probability is simply the product of two matrices representing the noise (transposed) and jitter distributions.

Subsequently, to calculate the total signal impairment (e.g., total jitter) at a particular user-definable BER value, the duty cycle distortion jitter components 135 and the data dependent jitter components 140 can be synthesized with the RJ*NP-BUJ*PJ convolution 167, thereby producing a convolution 180 of total jitter at a user-selected value of BER, or TJ@BER 152. This is accomplished while properly accounting for cross-talk-caused bound jitter and noise. The user-selected BER value may be arbitrary, although within realistic limits.

In an alternative embodiment, the PJ 170 need not be separated from the uncorrelated jitter 155. In this embodiment, the other separation and synthesis techniques described above can be performed, the components analyzed, and the total jitter at a user-selected value of BER can be obtained and analyzed, even though the PJ 170 was not separated from the uncorrelated jitter 155. In such case, rather than non-periodic uncorrelated jitter 160, in its place BUJ 163 (and corresponding BUJ PDF) can be isolated, including both periodic and non-periodic components.

In the alternative embodiment, the BUJ 163 can further be decomposed into PJ and NP-BUJ. In this case, the division between PJ and NP-BUJ can be imperfect because of a variety of time-related or computational factors, which can lead to partial correlation 172 between the PJ 170 and NP-BUJ 175 categorizations, which in turn can lead to inaccuracies when the PJ and NP-BUJ are convolved due to the presence of the partially correlated jitter distributions 172, which itself in turn can result in inaccurate (i.e., overly pessimistic) estimates of TJ@BER.

Specifically, such time-related or computational factors can include, for example, the observation period, the length of a Fast Fourier Transform (FFT) used in the decomposition process, or other algorithms used for spectral separation, any or all of which can result in some impairments of the signal under test being partially categorized as both PJ and NP-BUJ (i.e., an impairment can undesirably be categorized partially in the PJ "bucket" and partially in the NP-BUJ "bucket"). Put differently, such partial cross-categorization means that the two "buckets" can be partially correlated. Conventional methods are not capable of supplying enough information about NP-BUJ and PJ to discern this possible partial correlation, or the degree to which the components might be correlated.

While it may be desirable to entirely deconvolve the BUJ 163 into constituent parts to aid in additional analysis, the inventive techniques disclosed herein include either returning to a previously saved probability distribution of BUJ 163 for further processing, or at least giving an upper bound for an estimate based on the convolution NP-BUJ*PJ. The pessimism that is avoided is associated with what would otherwise be the presence of the partially correlated jitter 172, which has a characteristic of being partially associated with the PJ "bucket" or category while also being partially associated with the NP-BUJ "bucket" or category. Or, if the complete convolution of all components is undertaken, the component calculated as PJ*NP-BUJ can be used rather than the BUJ 163; but the two results can be verified against each other, and a disagreement can indicate an error or a correction.

By way of further refinement of the inventive techniques, the synthesized uncorrelated PDF 167 obtained as set forth in the approach associated with the embodiment discussed above may be compared with the synthesized uncorrelated PDF 167 as obtained in the approach associated with the alternative embodiment so as to identify possible correlation problems in the first approach or possible deconvolution problems in the second approach. A final resulting uncorrelated synthesized PDF may be produced based on such comparison, for example, by selecting the smaller of the bounded PDFs.

Figure 2:
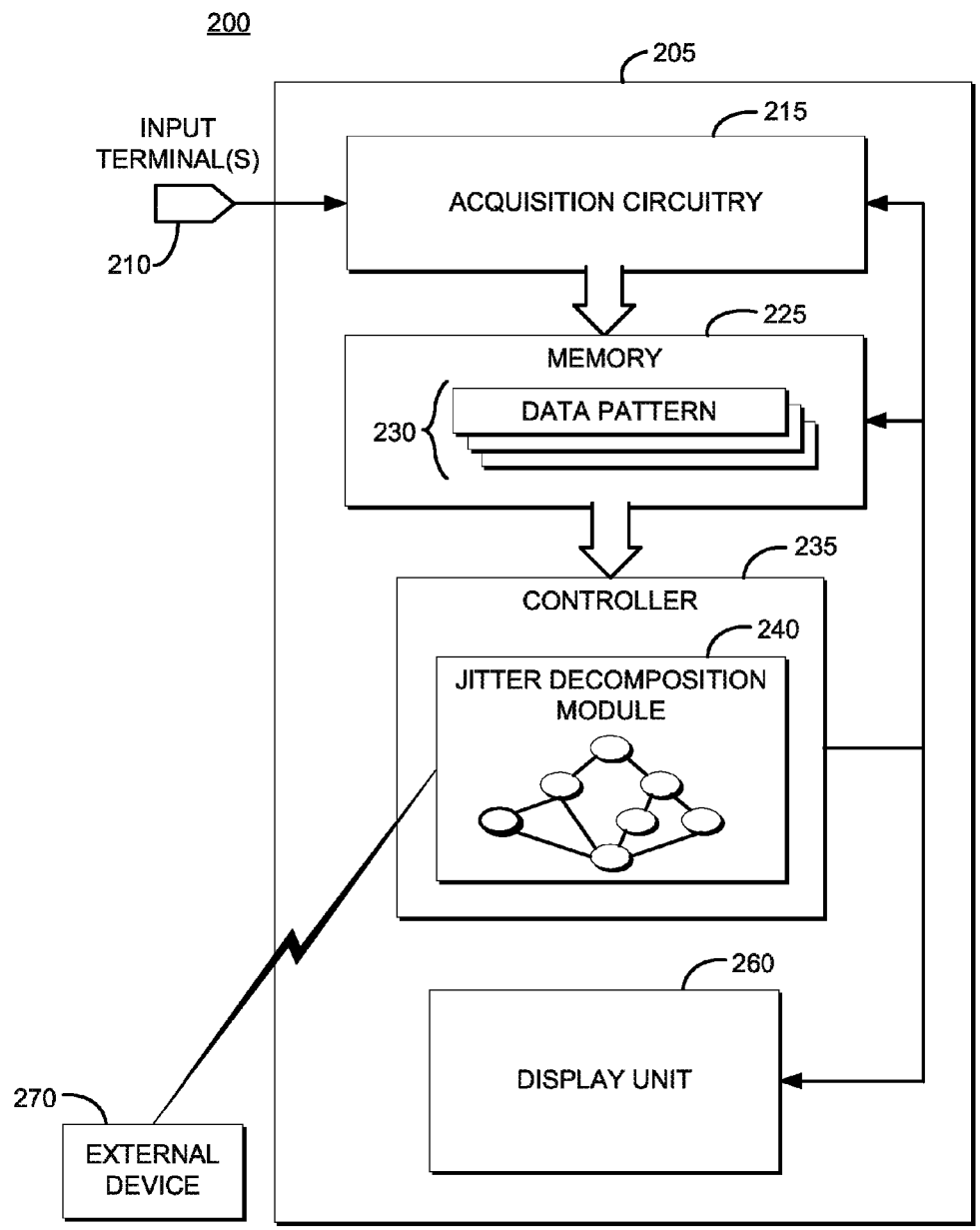
FIG. 2 illustrates a simplified block diagram of one embodiment of a test and measurement instrument, including a jitter decomposition module, according to embodiments of the present invention.

FIG. 2 illustrates a simplified block diagram 200 of one embodiment of a system 200, which may include an oscilloscope 205. In alternative embodiments, the system 200 may include a spectrum analyzer, a signal analyzer, some combination of the two, or another type of comparable test and measurement instrument or device or a simulation of such system whose function(s) is (are) substantially the same as the system 200. For the sake of consistency and explanation, the test and measurement instrument will be referred to herein as an oscilloscope.

In accordance with embodiments of the present invention, the oscilloscope 205 may include a jitter decomposition module 240. The system 200 may implement or include various exemplary embodiments of the present invention, which may be applied in a variety of ways and in a variety of different applications, including for example, the measurement and analysis of impairments associated with digital or analog signals (actual or simulated signals). The signals can be associated with, for example, high-frequency wired or wireless communication systems, high-speed memory or other logic circuits, storage devices, networks, may be simulated, and so forth. The system 200, and in particular module 240, may be used for precision decomposing, synthesizing, and/or analyzing either the jitter or noise impairment of a signal (actual or simulated), or both.

In one embodiment, the oscilloscope 205 can include, for example, one or more input means (for example, terminals 210), acquisition means or circuitry 215, storage medium (e.g., memory 225), a controller 235 (including the jitter decomposition module 240), and a display unit 260. The controller 235, and more specifically the jitter decomposition module 240, alone or in combination with other components of the oscilloscope 205, can implement or cause to be implemented any of the various embodiments of the present invention.

The oscilloscope 205 may have one, two, four, or any number of channels that are connected to input means 210, suitable for use with various embodiments as described herein. While components of the oscilloscope 205 are shown to be directly coupled to each other, it should be understood that the oscilloscope 205 can include a variety of other circuit or software components, inputs, outputs, and/or interfaces, which are not necessarily shown, but that are disposed between or otherwise associated with the illustrated components of oscilloscope 205.

One or more actual or simulated, analog or digital waveforms or electrical signals (collectively referred to as "signals") can be received at the input means 210. Acquisition circuitry 215 may include, for example, known electronic circuitry and/or devices for at least receiving the signals from terminals 210, sampling the signals, and converting the signals into digitized samples. The "acquired data" can then be stored in the memory 225. The acquired data can include one or more data patterns 230. As used herein, the term "acquired data" will be understood to include the reception of an original input signal, sampling of such a signal, and the conversion of such a signal into digital samples or bits when the signal is an analog signal.

The memory 225 may be any suitable recordable medium or storage medium capable of storing the acquired data, including the one or more data patterns 230. The memory 225 can take the form of RAM, ROM, and/or cache memory. RAM memory may be operable to store volatile data, such as the acquired data and corresponding data patterns 230 generated by the acquisition circuitry 215. If required or desired, the memory 225 may also store one or more time interval (TIE) values for comparison with the one or more data patterns 230. In addition, the memory 225 can store executable instructions that may be accessed by the controller 235. Alternatively, the acquired data, corresponding data patterns 230, associated aggregate jitter and noise, TIE values, and/or executable instructions may be stored in a recordable medium separate from the memory 225.

The controller 235 can be operatively coupled to the memory 225 and the display unit 260. The controller 235, and in particular the jitter decomposition module 240, may be operable to access and process the acquired data from the memory 225 in order to generate corresponding jitter distributions, histograms, probability density function curves, cumulative distribution function curves, Q-space plots, traces, and/or other jitter measurements, and all of the inventive methods and processes described herein, any of which may be displayed by the display unit 260.

As indicated above, the controller 235 can include the jitter decomposition module 240. Components of the controller 235 and/or the jitter decomposition module 240 may take the form of, or be implemented using hardware, software, firmware, or by any combination thereof. For example, executable instructions for implementing the inventive methods and processes described herein and for otherwise controlling the oscilloscope 205 may be stored and accessed from the memory 225. The controller 235 may be implemented as, for example, one or more programmable microprocessors, such as those designed and developed by Intel Corporation; or multiple programmable digital signal processors (which may be collectively referred to as "controller" or "controllers"

herein). In yet another embodiment, when the controller 235 is implemented using multiple controllers, one may be used to control the acquisition and processing of input signals while the second may control the other operations of the oscilloscope 205. The oscilloscope 205 may be further controlled using a Windows® Operating System, designed and developed by Microsoft Corporation that is stored, for example, within associated memory 225 and accessed, for example, by one or more controllers 235.

In some embodiments, the controller 235 can exchange information related to impairments (e.g., jitter or noise) with external device 270 via a conductor such as a bus or a wire. The external device 270 can include, for example, a computer separate from the oscilloscope 205, or an external memory device (e.g., mass storage unit), among other possibilities. The controller 235 can transmit information about a jitter analysis of the signal or waveform to the external device 270, and/or receive information from the external device 270 to enhance the jitter analysis performed using the oscilloscope 205.

Figure 3:
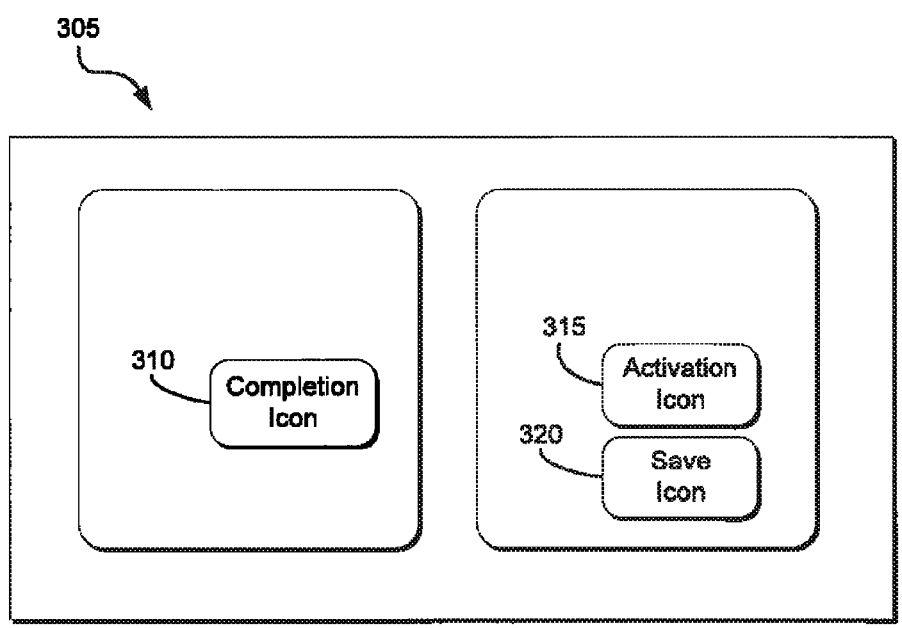
FIG. 3 illustrates a user interface that is a part of a system for activating and indicating completion of impairment analysis according to embodiments of the present invention.

FIG. 3 illustrates a user interface 305 that is a part of a system for activating and indicating completion of impairment analysis according to embodiments of the present invention. The user interface 305 may be part of the system 200 for activating signal impairment analysis (e.g., estimation of a probability density function (PDF) for uncorrelated and random jitter, synthesizing thereof, etc.), and for indicating when the analysis is completed. In one embodiment the user interface 305 may be a part of the display unit 260, and, thus, the display unit may be operable to display the user interface 305. In accordance with an embodiment of the invention, an activation icon 315 may be included in the interface 305 which when clicked with a mouse, touched with a finger or otherwise activated begins the process of executing the signal impairment methods and process(es) described herein. A save icon 320 may be selected (e.g., clicked, touched) to save the results of such methods and processes, for example in the memory 225. The user interface 305 may also include icon 310, which may be displayed for indicating when the methods and processes described herein are completed. It should be understood that the positioning of the icons 310, 315 and 320 is only for illustrative purposes and that their position may be altered without changing their function or the scope of the invention. Further, though shown as three separate icons, one or more of the icons 310, 315, and/or 320 may be combined into as few as one icon (e.g., an icon that blinks at a certain rate depending on its function, or uses different colors depending on its function) or may be further separated into additional icons.

Figure 4A:
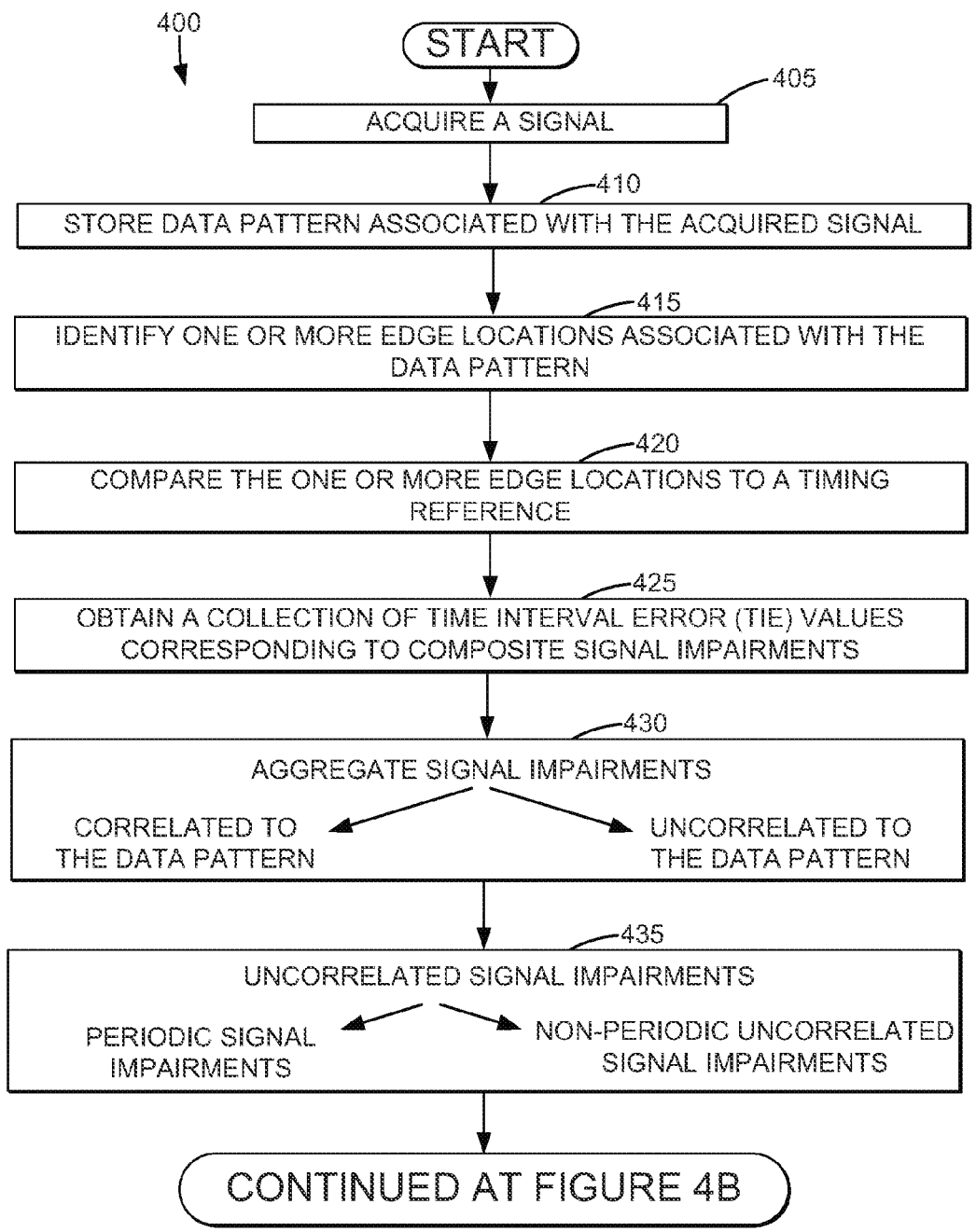
FIGS. 4A-4B illustrate a flow diagram for decomposing, synthesizing, and analyzing signal impairments according to an example embodiment of the present invention.
Figure 4B:
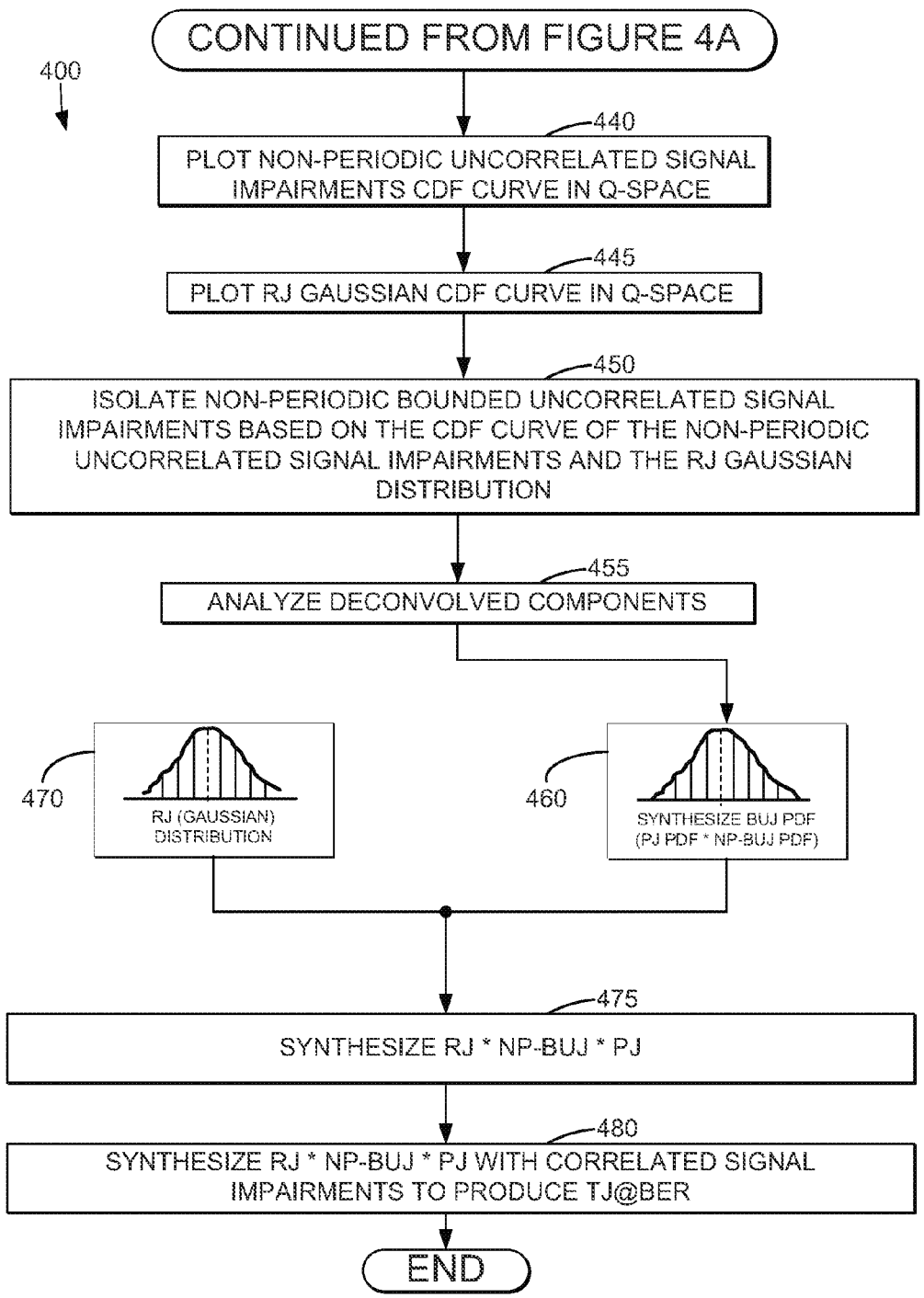

FIGS. 4A-4B illustrate a flow diagram 400 for decomposing, synthesizing, and analyzing signal impairments according to an example embodiment of the present invention. An exemplary method begins at 405, where a signal or waveform is received by an input of the oscilloscope 205, and acquired by the acquisition circuitry 215. At 410, the acquired data (e.g., the one or more data patterns 230) associated with the waveform may be stored in the memory 225. One or more edge locations of the data patterns associated with the waveform can be identified and analyzed at 415, and compared to a timing reference at 420. As a result, a collection of TIE values can be obtained at 425, which correspond to the composite or aggregate signal impairments of the signal 105.

The flow then proceeds to 430 where the aggregate signal impairments are decomposed into signal impairments that are correlated to the data pattern and signal impairments that are uncorrelated to the data pattern. The correlated signal impairments (e.g., deterministic jitter 120) are further decomposed using one or more known techniques (e.g., spectral, averaging, or the like).

In accordance with embodiments of the present invention, the remaining uncorrelated signal impairments are further decomposed at 435 into periodic signal impairments (e.g., PJ 125) and non-periodic uncorrelated signal impairments. For example, the uncorrelated signal impairments may be subjected to a spectral analysis or other mathematical deconvolution process, as explained above. The flow proceeds from FIG. 4A to FIG. 4B, where the non-periodic uncorrelated signal impairments are plotted at 440 as a CDF curve in Q-space. At 445, an assumed RJ Gaussian distribution is plotted as a CDF curve in Q-space. The flow then proceeds to 450, where non-periodic bounded uncorrelated signal impairments can be isolated based on the CDF curve of the non-periodic uncorrelated signal impairments and the RJ Gaussian distribution, as explained in detail above.

An analysis of the deconvolved or decomposed components can be performed at 455, which aids a user of the oscilloscope in understanding the impact of crosstalk on jitter and noise analysis of the signal. A mathematical derivation can be applied to the CDF curves to produce PDFs thereof. For example, a CDF curve of the non-periodic bounded uncorrelated signal impairments can be subjected to derivation to produce a PDF thereof.

The flow proceeds to 460, where the PDF of the periodic signal impairments (generated at step 435) can be convolved with the PDF of the non-periodic bounded uncorrelated signal impairments (generated at step 450) to produce a synthesized PDF of bounded uncorrelated signal impairments. At 475, the PDF of the bounded uncorrelated signal impairments may be convolved with the unbound Gaussian distribution 470 to produce a synthesized uncorrelated PDF, for example, RJ*NP-BUJ*PJ.

At 480, the correlated signal components such as the duty cycle distortion signal impairments (e.g., DCD 135) and the data dependent signal impairments (e.g., DDJ 140) can be synthesized with the synthesized uncorrelated PDF (e.g., RJ*NP-BUJ*PJ). Using the final synthesized signal impairment components, a more accurate estimate of the total signal impairment value can be determined at a user-definable bit error rate (e.g., TJ@BER or TN@BER). In addition, an estimated PDF of the total signal impairment of the waveform can be produced and stored. Thereafter, a CDF and complimentary CDF of the total signal impairment can be generated by integrating the PDF of the total signal impairment, which can aid in the analysis of the total signal impairment at the user-defined BER.

It will be understood that the determinations in the flow diagram 400 need not occur in the specific order as described, but rather, these determinations can be made at different times. It will also be understood that the steps described in these techniques need not necessarily occur in the order as illustrated or described.

Although particular embodiments have been described, it will be appreciated that the principles of the invention are not limited to those embodiments. In some embodiments, an article comprises a non-transitory medium having associated instructions that, when executed, results in a test and measurement instrument performing the steps of the various embodiments of the invention as disclosed herein. Other variations and modifications may be made without departing from the principles of the invention as set forth in the following claims.

The invention claimed is:

1. A method for analyzing signal impairments using a test and measurement instrument, the method comprising:
   acquiring a signal comprising aggregate signal impairments through at least one input terminal;
   decomposing the aggregate signal impairments into signal impairments that are correlated to a data pattern and signal impairments that are uncorrelated to the data pattern;
   decomposing the uncorrelated signal impairments into periodic signal impairments and non-periodic uncorrelated signal impairments;
   producing and storing on a storage medium a probability distribution function (PDF) of the periodic signal impairments;
   producing and storing on the storage medium a probability distribution function (PDF) of the non-periodic uncorrelated signal impairments;
   integrating the PDF of the non-periodic uncorrelated signal impairments, thereby producing an estimated cumulative distribution function (CDF) curve of the non-periodic uncorrelated signal impairments;
   estimating random signal impairments as an unbound Gaussian distribution;
   plotting the CDF curve of the non-periodic uncorrelated signal impairments and the unbound Gaussian distribution in Q-space; and
   isolating a CDF of non-periodic bounded uncorrelated signal impairments based on the CDF curve of the non-periodic uncorrelated signal impairments and the unbound Gaussian distribution in Q-space.

2. The method of claim 1, wherein isolating comprises:
   for each of a plurality of Q values in Q-space, subtracting a corresponding unbound Gaussian value from a corresponding non-periodic uncorrelated signal impairment value.

3. The method of claim 2, further comprising:
   plotting the CDF of the non-periodic bounded uncorrelated signal impairments for each of the plurality of Q values in Q-space.

4. The method of claim 3, further comprising:
   applying a mathematical derivation to the CDF of the non-periodic bounded uncorrelated signal impairments to produce a PDF thereof.

5. The method of claim 4, further comprising:
   storing the PDF of the non-periodic bounded uncorrelated signal impairments.

6. The method of claim 5, further comprising:
   convolving the PDF of the periodic signal impairments with the PDF of the non-periodic bounded uncorrelated signal impairments to produce a synthesized PDF of bounded uncorrelated signal impairments; and
   convolving the PDF of the bounded uncorrelated signal impairments with the unbound Gaussian distribution to produce a synthesized uncorrelated PDF.

7. The method of claim 6, further comprising:
   synthesizing duty cycle distortion components and data dependent jitter components with the synthesized uncorrelated PDF; and
   producing a convolution of total signal impairment at a user-selected bit error rate value.

8. The method of claim 1, wherein the signal impairments comprise jitter impairments.

9. The method of claim 1, wherein the signal impairments comprise noise impairments.

10. The method of claim 1, wherein the signal impairments comprise jitter and noise impairments, the method further comprising:
    reconciling, component by component, the jitter and noise signal impairments.

11. A method for analyzing signal impairments using a test and measurement instrument, the method comprising:
    acquiring a signal comprising aggregate signal impairments through at least one input terminal;
    decomposing the aggregate signal impairments into signal impairments that are correlated to a data pattern and signal impairments that are uncorrelated to the data pattern;
    producing and storing on a storage medium a PDF of uncorrelated signal impairments;
    integrating the PDF of the uncorrelated signal impairments, thereby producing an estimated cumulative distribution function (CDF) curve of the uncorrelated signal impairments;
    estimating random signal impairments as an unbound Gaussian distribution;
    plotting the CDF curve of the uncorrelated signal impairments and the unbound Gaussian distribution in Q-space; and
    isolating bounded uncorrelated signal impairments based on the CDF curve of the uncorrelated signal impairments and the unbound Gaussian distribution in Q-space.

12. The method of claim 11, wherein isolating comprises:
    for each of a plurality of Q values in Q-space, subtracting a corresponding unbound Gaussian value from a corresponding uncorrelated signal impairment value.

13. The method of claim 12, further comprising:
    plotting a CDF of the bounded uncorrelated signal impairments for each of the plurality of Q values in Q-space.

14. The method of claim 13, further comprising:
    applying a mathematical derivation to the CDF of the bounded uncorrelated signal impairments to produce a PDF thereof.

15. The method of claim 14, further comprising:
    storing the PDF of the bounded uncorrelated signal impairments.

16. The method of claim 15, further comprising:
    convolving the PDF of the bounded uncorrelated signal impairments with the unbound Gaussian distribution to produce a synthesized uncorrelated PDF.

17. The method of claim 16, further comprising:
    synthesizing duty cycle distortion components and data dependent jitter components with the synthesized uncorrelated PDF; and
    producing a convolution of total signal impairment at a user-selected bit error rate value.

18. The method of claim 11, wherein the signal impairments comprise jitter impairments.

19. The method of claim 11, wherein the signal impairments comprise noise impairments.

20. A test and measurement instrument, comprising:
    at least one input terminal;
    an acquisition circuitry to acquire a signal comprising aggregate signal impairments through the at least one input terminal;
    at least one storage medium;
    a controller including a decomposition module configured to decompose the aggregate signal impairments into signal impairments that are correlated to a data pattern and signal impairments that are uncorrelated to the data pattern, wherein the decomposition module is further configured to:
- decompose the uncorrelated signal impairments into periodic signal impairments and non-periodic uncorrelated signal impairments;
- produce and store a probability distribution function (PDF) of the periodic signal impairments;
- produce and store a PDF of the non-periodic uncorrelated signal impairments;
- integrate the PDF of the non-periodic uncorrelated signal impairments to produce an estimated cumulative distribution function (CDF) curve of the non-periodic uncorrelated signal impairments;
- estimate random signal impairments as an unbound Gaussian distribution; plot the CDF curve of the non-periodic uncorrelated signal impairments and the unbound Gaussian distribution in Q-space; and
- isolate a CDF of non-periodic bounded uncorrelated signal impairments based on the CDF curve of the non-periodic uncorrelated signal impairments and the unbound Gaussian distribution in Q-space.

21. The test and measurement instrument of claim 20, wherein the decomposition module is further configured to:
- for each of a plurality of Q values in Q-space, subtract a corresponding unbound Gaussian value from a corresponding non-periodic uncorrelated signal impairment value.

22. The test and measurement instrument of claim 21, further comprising a display device, wherein the decomposition module is further configured to:
- plot, on the display device, the CDF of the non-periodic bounded uncorrelated signal impairments for each of the plurality of Q values in Q-space.

23. The test and measurement instrument of claim 22, wherein the decomposition module is further configured to:
- apply a mathematical derivation to the CDF of the non-periodic bounded uncorrelated signal impairments to produce a PDF thereof.

24. The test and measurement instrument of claim 23, wherein the decomposition module is further configured to:
- convolve the PDF of the periodic signal impairments with the PDF of the non-periodic bounded uncorrelated signal impairments to produce a synthesized PDF of bounded uncorrelated signal impairments; and
- convolve the PDF of the bounded uncorrelated signal impairments with the unbound Gaussian distribution to produce a synthesized uncorrelated PDF.

25. The test and measurement instrument of claim 24, wherein the decomposition module is further configured to:
- synthesize duty cycle distortion components and data dependent jitter components with the synthesized uncorrelated PDF; and
- produce a convolution of total signal impairment at a user-selected bit error rate value.

26. The test and measurement instrument of claim 20, wherein the signal impairments comprise jitter impairments.

27. The test and measurement instrument of claim 20, wherein the signal impairments comprise noise impairments.

28. The test and measurement instrument of claim 20, wherein the signal impairments comprise jitter and noise impairments, and the decomposition module is further configured to:
- reconcile, component by component, the jitter and noise signal impairments.

* * * * *